United States Patent [19]
Sakuma

[11] Patent Number: 5,577,260
[45] Date of Patent: Nov. 19, 1996

[54] DATA PROCESSING SYSTEM HAVING A SERIAL INTERFACE COMPRISING AN END-OF-TRANSMISSION FLAG

[75] Inventor: Hajime Sakuma, Tokyo, Japan

[73] Assignee: NEC Corporation, Tokyo, Japan

[21] Appl. No.: 294,010

[22] Filed: Aug. 23, 1994

[30] Foreign Application Priority Data

Aug. 23, 1993 [JP] Japan ................................. 5-229451

[51] Int. Cl.$^6$ ............................................. G06F 9/00
[52] U.S. Cl. .................... 395/800; 395/733; 395/740; 364/943.9; 364/947.6; 364/DIG. 1
[58] Field of Search ................................. 395/800, 725, 395/200.01, 733, 740; 364/DIG. 1, 943.9, 947.6

[56] References Cited

U.S. PATENT DOCUMENTS

| | | | |
|---|---|---|---|
| 4,101,732 | 7/1978 | Suzuki | 370/48 |
| 4,811,361 | 3/1989 | Bacou et al. | 375/242 |
| 4,868,784 | 9/1989 | Marshall et al. | 178/53.1 |
| 5,163,150 | 11/1992 | Matsushima et al. | 395/725 |
| 5,361,260 | 11/1994 | Mito | 370/85.1 |

FOREIGN PATENT DOCUMENTS

| | | |
|---|---|---|
| 2142175A | 1/1985 | European Pat. Off. . |
| 60-183639 | 9/1985 | Japan . |
| 63-095551 | 4/1988 | Japan . |

OTHER PUBLICATIONS

Mano, "Computer Engineering Hardware Design", 1988, pp. 122–123.

Primary Examiner—Alyssa H. Bowler
Assistant Examiner—Dzung C. Nguyen
Attorney, Agent, or Firm—Whitham, Curtis, Whitham & McGinn

[57] ABSTRACT

In a data processor including a serial interface, the serial interface internally includes a transmission end flag formed of a RS flipflop which set in response to the starting of the transmission of data of one byte and reset in response to completion of the transmission of the data of one byte. When the operation is changed from a macroservice processing for a serial data transmission to a vector interrupt processing, a CPU watches and discriminates the condition of the transmission end flag in a programmed operation of the CPU, thereby detecting a timing where data to be transmitted is transferred to a transmission shift register in the serial interface.

2 Claims, 4 Drawing Sheets

DATA PROCESSING SYSTEM HAVING A SERIAL INTERFACE COMPRISING AN END-OF-TRANSMISSION FLAG

BACKGROUND OF THE INVENTION

1. Field of the Invention

The present invention relates to a data processing system such as a microcomputer, having a serial interface.

2. Description of Related Art

In a conventional data processing system including a microprogram controlled central processing unit (CPU), an interrupt controller (INTC) and a serial interface, it is in many cases that a simple input/output processing such as a serial data sending/receiving is performed by a macroservice function, not by a programmed processing based on a vector interrupt. Here, the vector interrupt is that a program counter (PC) and a program status word (PSW) is automatically saved to a stack memory and an operation is branched into an interrupt processing routine so as to execute a predetermined program written by macro-instructions. On the other hand, the macroservice is that, in response to an interrupt request, a data transfer is performed, by a hardware, between a special function register and a memory space. For example, if a macroservice request is generated, the CPU temporarily stops execution of the program, and automatically carries out a data transfer of one or two bytes between the special function register and the memory. When the data transfer is completed, the interrupt request flag is reset, and the CPU resumes the execution of the program. Alternatively, after the data transfers of the number set in a macroservice counter have been performed, the vector interrupt request is generated.

Differently from other interrupt processings, this macroservice processing does not activate an interrupt processing program, but automatically performs a predetermined processing stored in a microprogram ROM (read only memory). Accordingly, a series of operations including the branching to the interrupt service routine, the saving and returning of the registers, the returning from the interrupt service routine, are not performed. Accordingly, it is possible to elevate the service time of the CPU and to reduce the number of steps in the program.

Referring to FIG. 1, there is shown a block diagram of one typical example of the conventional data processor having a serial interface. The shown data processor includes a CPU 1, an interrupt controller (INTC) 2 and a serial interface 3, which are interconnected through an internal bus 4.

In response to a transmission start signal ST from the CPU 1, data on the internal bus 4 is set into the serial interface 3, and thereafter, the data is serially transferred from an output terminal OUT. If the data to be sent in the serial interface 3 becomes empty, a request signal REQ is generated in the serial interface 3 and sent to the interrupt controller 2.

If the interrupt controller 2 receives the request signal REQ from the serial interface 3, the interrupt controller 2 discriminates the priority order Of the interrupt and the status of the interrupt mask. If it is permissible to acknowledge the request signal REQ, the interrupt controller 2 asynchronously outputs an interrupt request signal INTREQ to the CPU 1.

If the CPU 1 receives the interrupt request signal INTREQ from the interrupt controller 2, the CPU 1 executes a processing in accordance with the value MS/$\overline{INT}$ of a status flag register 2A in the interrupt controller 2. If MS/$\overline{INT}$=1, a microprogram for the macroservice is activated so as to execute the macroservice function processing. If MS/$\overline{INT}$=0, the vector interrupt processing is executed. Incidentally, the CPU 1 can rewrite the status flag register 2A by outputting a signal WR to the interrupt controller 2. The CPU includes a macroservice counter. (MSC) 1A, which can be formed by utilizing for example an internal RAM (random access memory).

Referring to FIG. 2, there is shown a detailed circuit diagram of the serial interface 3. In FIG. 2, in response to the transmission start signal ST from the CPU 1, a transmission shift register 31 of for example eight bits is set with the data on the internal bus 4 which is also of eight bits in this case. The 8-bit data stored in the shift register 31 is shifted in response to a serial clock CLK so as to be serially outputted through an output buffer 32 form the output terminal OUT. Thus, a serial transmission is carried out.

All stages or bits of the transmission shift register 31 are coupled to a transmission end detection circuit 33, which is configured to detect whether or not the transmission shift register 31 becomes empty, for the purpose of detecting completion of the transmission of the 8-bit data. This transmission end detection circuit 33 generates the above mentioned request signal REQ. For example, this transmission end detection circuit 33 can be constituted of an eight-input exclusive-OR circuit.

Now, the macroservice function of the data processor shown in FIG. 1 including the serial interface 3 shown in FIG. 2 will be described with reference to FIG. 3 illustrating the flow of operation.

At the time of serially transmitting a plurality of bytes of data, the number of serial transmissions is firstly set into the macroservice counter 1A which is managed in the course of the macroservice processing, in order to ensure that a predetermined number of macroservices are performed. In addition, the value MS /$\overline{INT}$ of the status flag register 2A in the interrupt controller 2 is previously set to "1".

When the transmission shift register 31 becomes empty, the request signal REQ is generated by the serial interface 3, and then, the interrupt request signal INTREQ is generated by the interrupt controller 2. Therefore, the CPU 1 executes the macroservice function processing in accordance with the value MS/$\overline{INT}$(=1) of the status flag register 2A in the interrupt controller 2. Namely, the CPU transfers one byte of data to be transmitted, through the internal bus 4 to the transmission shift register 31, and further decrements the macroservice counter 1A by one. The data set into the transmission shift register 31 is serially outputted from the output terminal OUT in synchronism with the serial clock CLK. When the transmission shift register 31 becomes empty again, the request signal REQ is generated by the serial interface 3, again.

In the above mentioned manner, a series of bytes of data to be transmitted are transferred continuously. When a last byte of data of the predetermined number of bytes of data to be transmitted has been transferred to the transmission shift register 31, the value MSC of the macroservice counter 1A is brought to 0 (zero). In response to MSC=0, the CPU 1 rewrites the value MS/$\overline{INT}$ of the status flag register 2A in the interrupt controller 2 to 0 (zero) by the signal WR. As a result, the macroservice function processing is completed.

In the above mentioned condition, if the transmission shift register 31 becomes empty, the request signal REQ is generated by the serial interface 3. At this time, if no interrupt signal is generated by the other interrupt sources, the interrupt request signal INTREQ is generated by the interrupt controller 2, and sent to the CPU 1. Since the value MS/INT of the status flag register 2A in the interrupt controller 2 is 0 (zero) which designates the vector interrupt, the CPU 1 activates a microprogram for the vector interrupt, so that a vector interrupt processing program is activated.

However, when new data to be transmitted is transferred to the transmission shift register 31 in the vector interrupt processing just after the completion of the macroservice function processing, the serial transmission of the last byte of data transferred to the transmission shift register 31 at the end of the macroservice function processing has not yet been completed, since the processing speed of the CPU 1 (for example, on the order of MHz) is greatly different from the serial transmission speed of the serial interface 3 (for example, on the order of KHz).

In order to overcome this inconvenience, it is the prior art manner to transfer the new data to be transmitted to the transmission shift register 31 with a sufficient delay time, or to inhibit the transfer of the data to the transmission shift register 31 in the course of the vector interrupt processing. In other words, in a special case of changing from the macroservice function processing to the vector interrupt processing, a mismatching occurs between the serial transmission status of the transmission shift register 31 and the software processing of the CPU.

SUMMARY OF THE INVENTION

Accordingly, it is an object of the present invention to provide a data processing which has a serial interface and which has overcome the above mentioned defect of the conventional one.

Another object of the present invention is to provide a data processing which has a serial interface and which can transfer new data to a serial transmission shift register in a serial interface, at an appropriate timing with no wasteful waiting time, in a vector interrupt processing just after completion of a macroservice function processing.

The above and other objects of the present invention are achieved in accordance with the present invention by a data processor comprising a bus, a Central processing unit coupled to the bus, an interrupt controller coupled to the bus and asynchronously generating a processing request to the central processing unit, and a serial interface coupled to the bus and for serially outputting data to an external device. The serial interface is configured to receive data to be transmitted, from the central processing unit through the bus and to serially transmit the received data to the external device. The serial interface includes a transmission end flag which is brought into a first condition in response to the starting of the transmission of data of one transmission unit and also brought into a second condition different from the first condition, in response to completion of the transmission of the data of one transmission unit. The interrupt controller is configured to receive a request signal from the serial interface and to output an interrupt request signal to the central processing unit. The interrupt controller includes a status flag indicative of whether an operation is in a macroservice processing or in a vector interrupt processing. The central processing unit is configured to respond to the interrupt request signal to execute one of the macroservice processing and the vector interrupt processing designated by the status flag. The central processing unit is also configured to change the status flag to a value indicative of the vector interrupt processing after completion of the macroservice processing. The central processing unit is further configured to discriminate the condition of the transmission end flag in the course of the vector .interrupt processing so as to transfer new data to the serial interface .in accordance with the condition of the transmission end flag.

As will be apparent from the above, the data processor in accordance with the present invention is characterized by provision, in the serial interface, of the transmission end flag which is brought into the first condition in response to the starting of the transmission of data of one transmission unit and also brought into the second condition in response to completion of the transmission of the data of one transmission unit.

With provision of the transmission end flag, when the operation is changed from the macroservice function processing for the serial data transmission to the vector interrupt processing, the CPU watches and discriminates the condition of the transmission end flag in a programmed operation Of the CPU, thereby capable of detecting a timing where the data to be transmitted is transferred to the transmission shift register.

The above and other objects, features and advantages of the present invention will be apparent from the following description of preferred embodiments of the invention with reference to the accompanying drawings.

DESCRIPTION OF THE PREFERRED EMBODIMENTS

Figure 4:
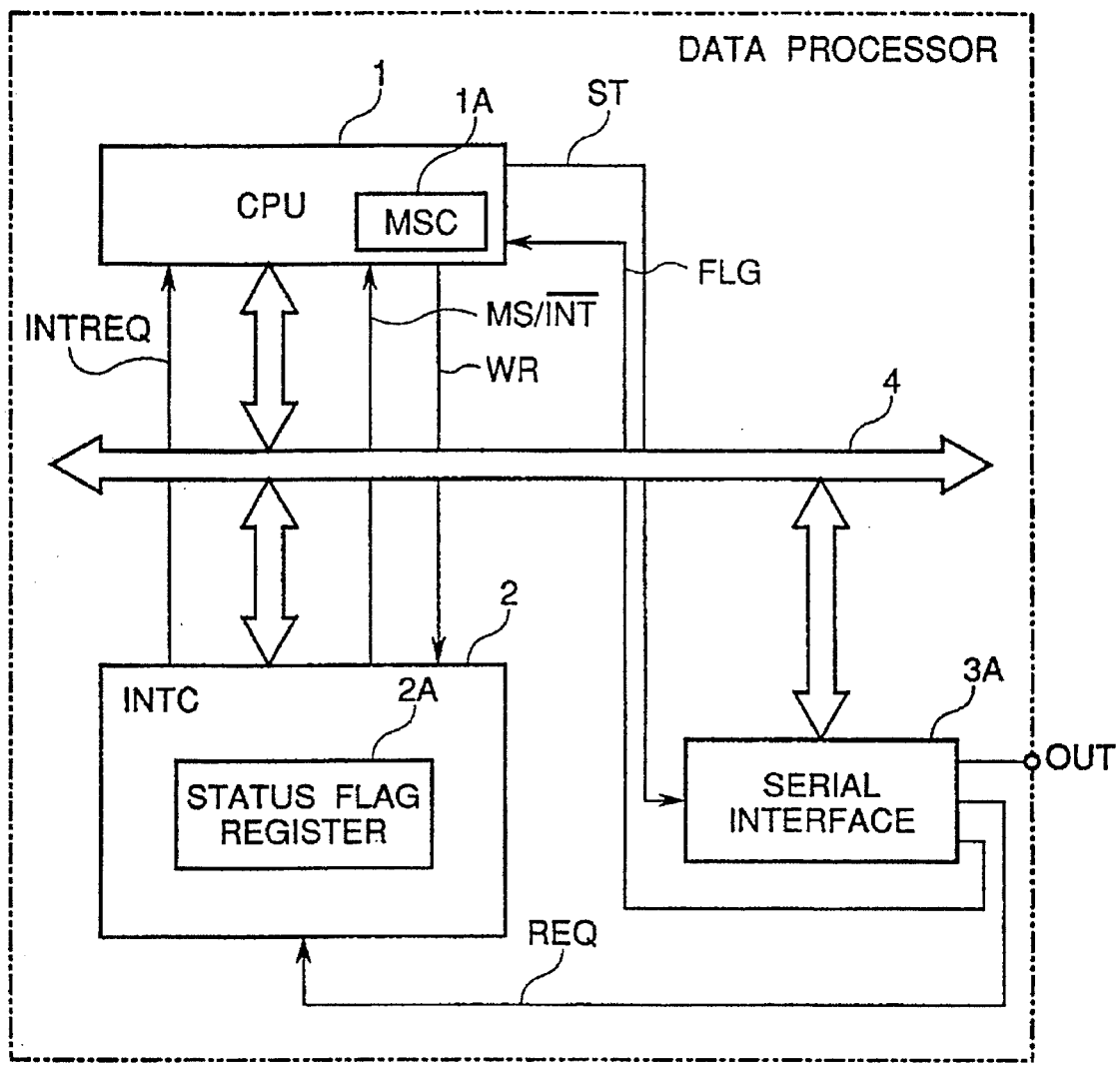
FIG. 4 is a block diagram of one embodiment of the data processor having a serial interface and in accordance with the present invention.

Referring to FIG. 4, there is shown a block diagram of one embodiment of the data processor having a serial interface and in accordance with the present invention. In FIG. 4, elements similar or corresponding to those shown in FIG. 1 will be given the same Reference Numerals and Signs, and explanation thereof will be omitted.

Figure 1:
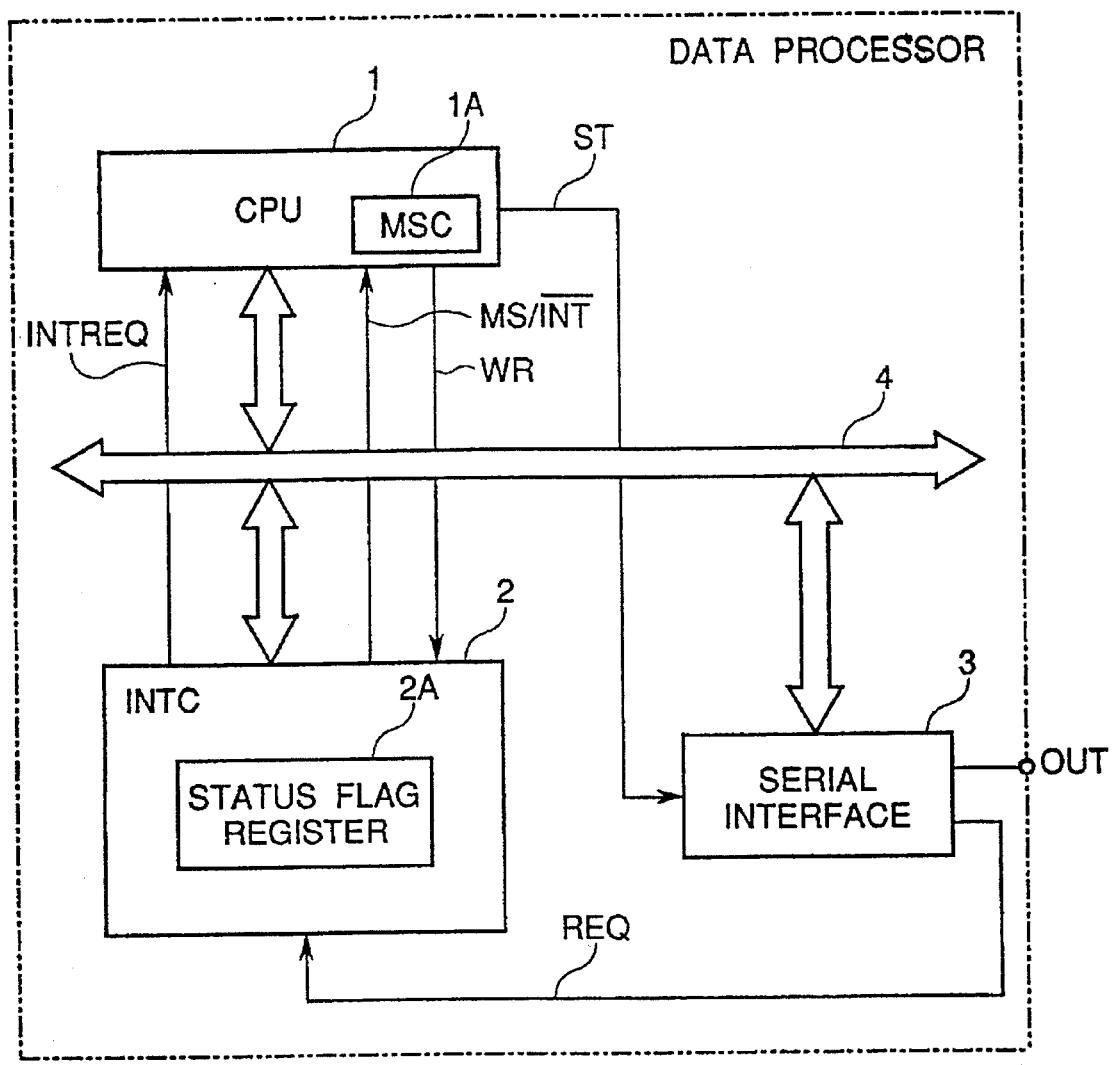
FIG. 1 is a block diagram of one typical example of the conventional data processor having a serial interface.

As will be apparent from comparison between FIGS. 1 and 4, the embodiment shown in FIG. 4 is different from the conventional data processor shown in FIG. 1, in that a transmission end flag signal FLG indicative of completion of the data transmission from the transmission shift register 31 is outputted from a serial interface 3A to the CPU 1.

Figure 2:
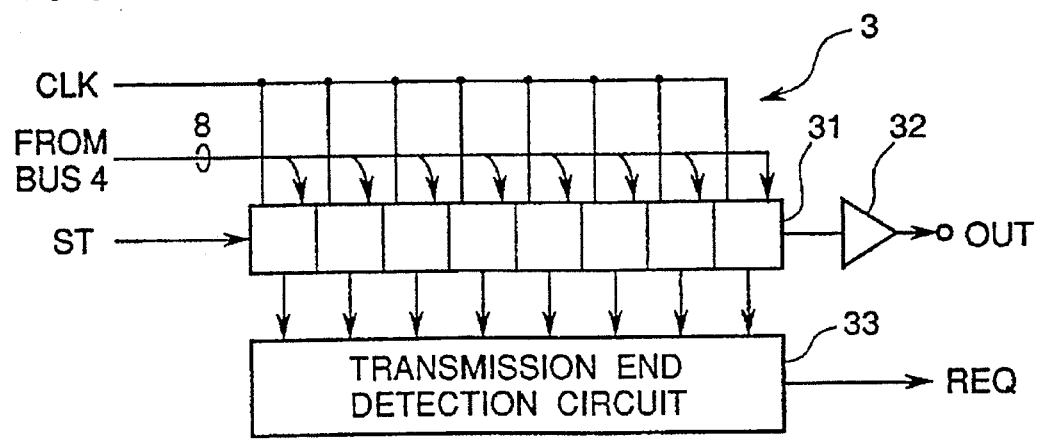
FIG. 2 is a detailed circuit diagram of the serial interface provided in the conventional data processor shown in FIG. 1.
Figure 5:
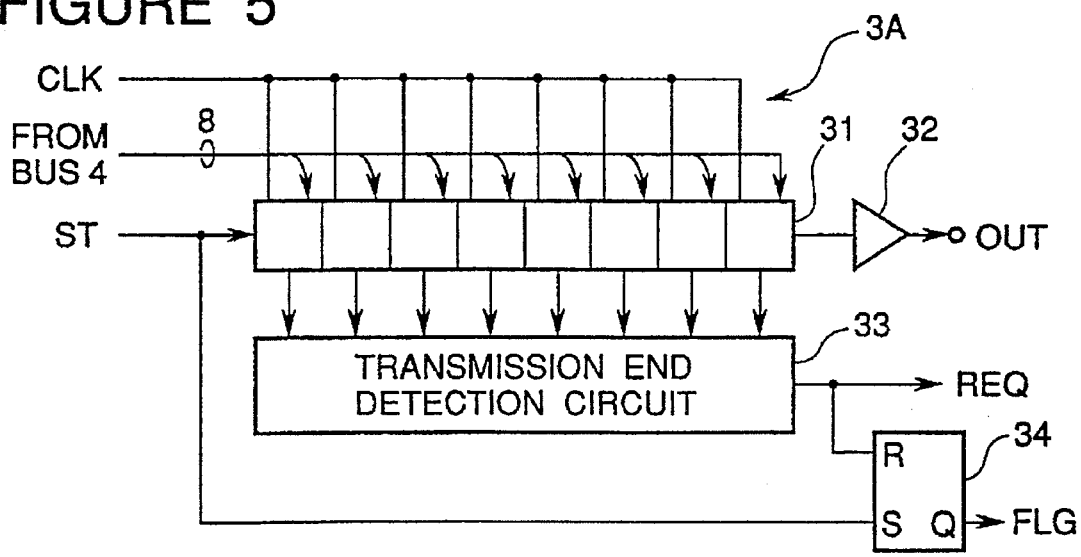
FIG. 5 is a detailed circuit diagram of the serial interface provided in the data processor shown in FIG. 4.

The serial interface 3A is constructed as shown in FIG. 5. In FIG. 5, elements similar or corresponding to those shown in FIG. 2 will be given the same Reference Numerals and Signs, and explanation thereof will be omitted. As will be apparent from comparison between FIGS. 2 and 5, the serial interface 3A shown in FIG. 5 is different from the conventional serial interface 3 shown in FIG. 2, in that a RS flipflop (reset/set flipflop) 34 is added, which includes a set input "S" connected to receive the transmission start signal ST and a reset input "R" connected to receive the request signal REQ outputted from the transmission end detection circuit 33. An output "Q" of the RS flipflop 34 generates the above mentioned transmission end flag signal FLG.

Figure 6:
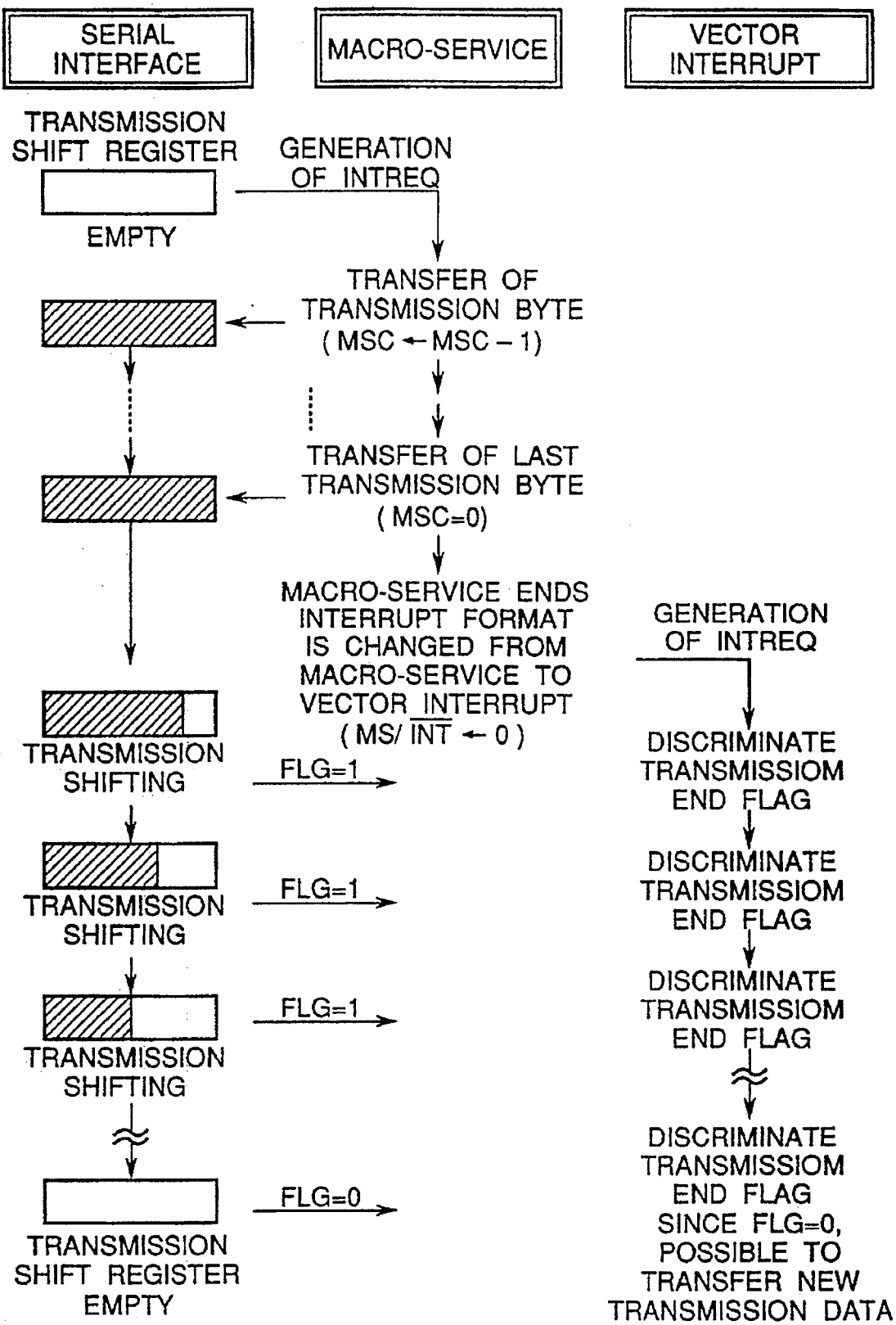
FIG. 6 illustrates the flow of operation of the data processor shown in FIG. 4, in a macroservice function processing for a serial data transmission and a succeeding vector interrupt processing of transferring data to the serial interface.

Now, the macroservice function of the data processor shown in FIG. 4 including the serial interface 3A shown in FIG. 5 will be described with reference to FIG. 6 illustrating the flow of operation.

Figure 3:
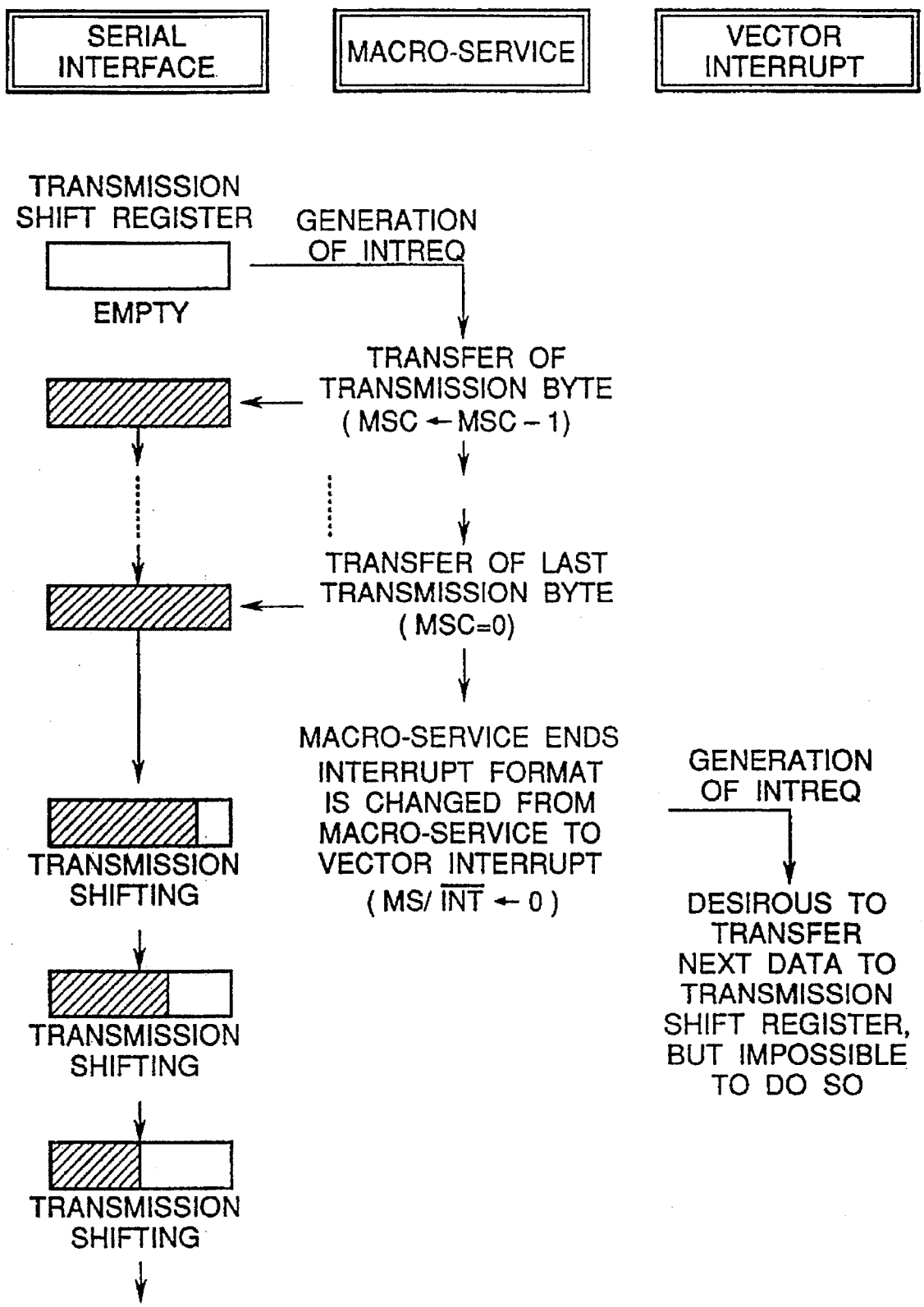
FIG. 3 illustrates the flow of operation of the conventional data processor shown in FIG. 1, in a macroservice function processing for a serial data transmission and a succeeding vector interrupt processing of transferring data to the serial interface.

Operation is the same as that shown in FIG. 3, until a last byte of data of the predetermined number of bytes of data to be transmitted has been transferred to the transmission shift register 31, and the value MSC of the macroservice counter 1A is brought to 0 (zero), with the result that, in response to MSC=0, the CPU 1 rewrites the value MS/INT of the status flag register 2A in the interrupt controller 2 to 0 (zero) by the signal WR, and therefore, the macroservice function processing is completed.

In the above mentioned condition, if the transmission shift register 31 becomes empty, the request signal REQ is generated by the serial interface 3A. If no interrupt signal is generated by the other interrupt sources, the interrupt request signal INTREQ is generated by the interrupt controller 2, and sent to the CPU 1. At this time, since the value MS/INT of the status flag register 2A in the interrupt controller 2 is 0 (zero) which designates the vector interrupt, the CPU 1 activates a microprogram for the vector interrupt, so that a vector interrupt processing program is activated.

In this case, however, the CPU 1 watches the transmission end flag signal FLG of the serial interface 3A at predetermined constant intervals in the course of execution of a vector interrupt processing program. If the transmission end flag signal FLG is "1", the CPU 1 does not transfer a new byte of data to be transmitted, to the serial interface 3A. If the transmission shift register 31 becomes empty, namely, if the transmission end flag signal FLG becomes "0" (zero) which means that the CPU 1 can transfer a new byte of data to be transmitted, to the serial interface 3A, the CPU 1 transfers a new byte of data to be transmitted, to the serial interface 3A, in accordance with the vector interrupt processing program.

As seen from the above description, in the embodiment, a polling of the transmission end flag FLG constituted of the RS flipflop 34 in the serial interface 3A is carried out by reading the transmission end flag FLG in the vector interrupt processing for the purpose of discriminating the condition of the transmission end flag FLG, and by executing a conditional branch instruction on the basis of the result of the discrimination of the transmission end flag FLG. However, if the program status word (PSW) and a branch condition code in a conditional branch instruction have a free space, the transmission end flag FLG can be allocated to these free spaces, so that the polling of the transmission end flag FLG can be executed with only one conditional branch instruction. In any case, it is on the premise that the CPU has a function of polling the transmission end flag FLG on the basis of the vector interrupt processing program.

In addition, the embodiment is such that the RS flipflop for the transmission end flag FLG is set by the transmission start signal ST and reset by the request signal REQ. However, the RS flipflop can be reset by the transmission start signal ST and set by the request signal REQ. Either situation can be treated by a program.

As will be apparent from the above, the timing of transferring data to the transmission shift register can be detected by watching the transmission end flag. Therefore, it is possible to solve the disadvantage of the conventional data processor in which since it is not possible in a programmed operation to discriminate whether or not it is permissible to transfer data to the transmission shift register, the data is transferred to the transmission shift register with a sufficient delay time, or alternatively, it is inhibited to transfer data to the transmission shift register in the course of the vector interrupt processing. In other words, it is possible to eliminate the mismatching between the serial transmission status of the transmission shift register and the software processing of the CPU.

The invention has thus been shown and described with reference to the specific embodiments. However, it should be noted that the present invention is in no way limited to the details of the illustrated structures but changes and modifications may be made within the scope of the appended claims.

I claim:

1. A data processor comprising:

a bus;

a central processing unit coupled to said bus;

an interrupt controller coupled to said bus and asynchronously generating a processing request to said central processing unit; and a serial interface coupled to said bus for serially outputting data to an external device, said serial interface for receiving a data byte to be transmitted from said central processing unit through said bus and serially transmitting the received data to the external device, said serial interface including a transmission end flag which is brought into a first condition in response to starting data transmission and brought into a second condition in response to completion of transmission of one byte of said data, said interrupt controller for receiving a request signal from said serial interface and for outputting an interrupt request signal to said central processing unit, said interrupt controller including a status flag indicative of whether an operation is a macroservice processing or a vector interrupt processing, said central processing unit for responding to said interrupt request signal to execute one of said macroservice processing and said vector interrupt processing designated by said status flag, said central processing unit further changing said status flag to a value indicative of said vector interrupt processing after completion of said macroservice processing, said central processing unit discriminating a condition of said transmission end flag in the course of said vector interrupt processing so as to transfer new data to said serial interface in accordance with a condition of said transmission end flag, wherein said serial interface comprises:

a transmission shift register receiving data through said bus from said central processing unit in response to a transmission start signal from said central processing unit, said transmission shift register operating to serially output said data in response to a serial clock; and a transmission end detection circuit connected to all bits of said transmission shift register to detect an empty condition for said transmission shift register so as to generate said request signal, said transmission end flag being put into said first condition in response to said transmission start signal and put into said second condition in response to said request signal.

2. A data processor claimed in claim 1 wherein said transmission end flag comprises an RS flip-flop set in response to said transmission start signal and reset in response to said request signal.

* * * * *